United States Patent
Schirdewahn

(10) Patent No.: US 7,257,746 B2
(45) Date of Patent: Aug. 14, 2007

(54) SYSTEM FOR PROTECTION LINK SUPERVISION

(75) Inventor: Jochen Christof Schirdewahn, Jar (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 239 days.

(21) Appl. No.: 10/526,720

(22) PCT Filed: Sep. 10, 2002

(86) PCT No.: PCT/NO02/00318

§ 371 (c)(1),
(2), (4) Date: Mar. 4, 2005

(87) PCT Pub. No.: WO2004/025865

PCT Pub. Date: Mar. 25, 2004

(65) Prior Publication Data

US 2005/0268182 A1    Dec. 1, 2005

(51) Int. Cl.
G01R 31/28 (2006.01)
G06F 11/00 (2006.01)

(52) U.S. Cl. .................. 714/712; 714/715; 370/242

(58) Field of Classification Search .................. None
See application file for complete search history.

(56) References Cited

U.S. PATENT DOCUMENTS

| 6,011,778 | A  | * | 1/2000 | Kilkki et al. | ............... 370/232 |
| 6,294,991 | B1 |   | 9/2001 | Bengston et al. | |
| 6,590,864 | B1 | * | 7/2003 | Suzuki | ............... 370/225 |
| 6,766,482 | B1 | * | 7/2004 | Yip et al. | ............... 714/717 |
| 7,130,275 | B2 | * | 10/2006 | Gross et al. | ............... 370/242 |

* cited by examiner

Primary Examiner—Phung My Chung

(57) ABSTRACT

In a transmission network utilizing link fault protection between nodes, a working and a standby transmission line are terminated at each node with termination boards. The termination boards are adapted to report faults to a link supervision block. The link supervision block is adapted to switch between transmission lines in case of a fault. One or more persistency timers are coupled between the termination boards and the supervision block. A predetermined persistency period is applied to received fault cause(s) from the termination boards and correlated. The persistence of the correlation result is also timed and traffic is switched from one of the transmission lines to the other according to a predetermined correlation result persistency timer period.

9 Claims, 2 Drawing Sheets

SYSTEM FOR PROTECTION LINK SUPERVISION

TECHNICAL FIELD

The present invention relates to a system of performing protection link fault supervision in a Synchronous Digital Hierarchical (SDH) based network. The principles of the SDH protocol are described in International Telecommunication Union recommendation ITU G.707.

TECHNICAL BACKGROUND

To connect Radio Network Controller nodes to form a Radio Access Network, there is a need to protect the physical lines connecting these nodes against failure. A common architecture to achieve line protection in an SDH based network uses two physical lines to connect two nodes of the network. The node that is sending the data traffic, sends the data on two lines to the receiving node. If one of the lines breaks, the receiving node can extract the traffic from the other line.

The RNC node includes two line termination boards, of which one is active and the other is in standby mode. A link supervision block supervises the function of the lines and termination boards, and performs a switchover from the active to the standby board should a fault occur on one of the connections.

In the AXE system manufactured by Telefonaktiebolaget LM Ericsson such a supervision system is implemented. Faults detected on the active board are sent towards the supervision block spontaneously when they are detected. The supervision block then reads out state information from the standby board. The results are correlated to achieve information about a fault cause (failure in the active board or the connected line, failure in the standby board or the connected line, failure in the internal link between the boards, no failure).

Such a system is prone to some problems:

We can imagine that an identical fault is detected on both boards. Due to varying detection and signal transmission times, it is undetermined which fault (i.e. from which board) that will be reported first. Then the correlation result might not reflect the true physical situation, and the supervision block may misunderstand the situation. Varying detection times is caused by the standby board not reporting faults immediately, but instead checks the situation at fixed time intervals.

Even a single short disturbance can lead to a failure being reported without being justified.

In addition, the active and standby boards have two rather different functions. In case of failure, the functions must be swapped, without loosing information on the faults that has occurred. This might be complicated to implement in a computer program.

SUMMARY OF THE INVENTION

It is an object of the present invention to provide a supervision system for protecting transmission paths in radio access networks, which is more reliable in deciding the true cause of a fault.

Another object of the invention is to provide a system that is nearly immune against random disturbances.

Still another object is to provide a system that is less costly to implement than prior art systems.

These and other objects are achieved in a system as defined in the appended patent claims.

BRIEF DESCRIPTION OF THE DRAWINGS

The invention will now be described in detail in reference to the appended drawings, in which FIG. 1 gives a schematic overview of the circuitry used in current radio access network nodes in order to protect against line faults.

DETAILED DESCRIPTION OF THE INVENTION

Figure 1:
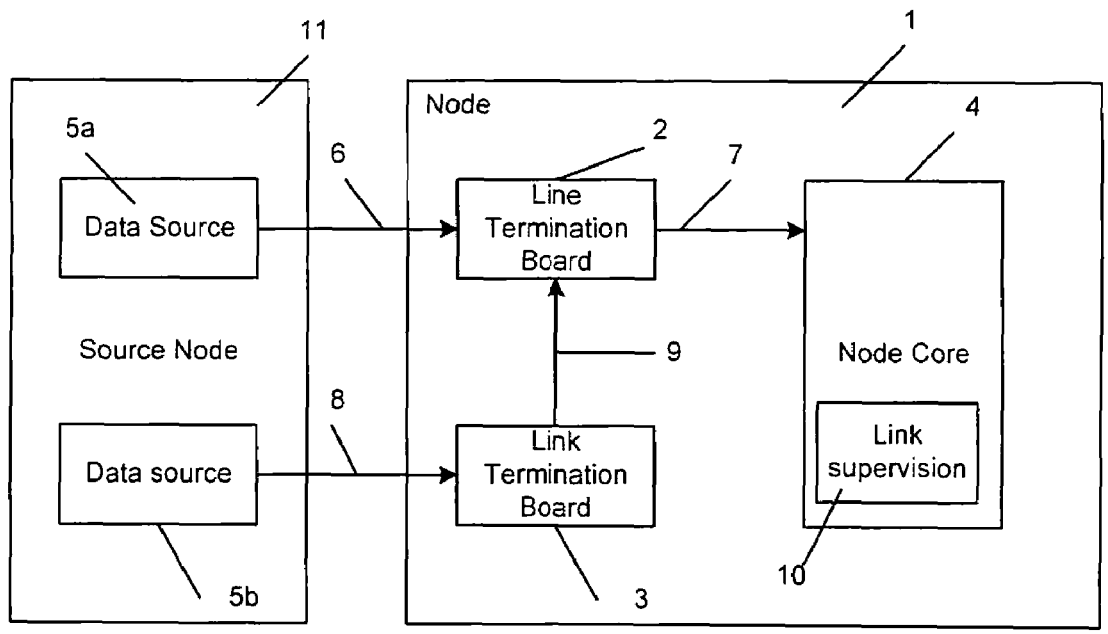

FIG. 1 shows two radio access network nodes, 11 and 1, with redundant lines, 6 and 8, between the nodes for securing a reliable connection between them.

The node 1 has an active Line Termination Board 2 that carries the data traffic, a passive Line Termination Board 3 that can be used as a replacement and a Node Core 4 that switches the data traffic and contains a Link Supervision instance 10.

The incoming data traffic is sent from a source node 11. The data source 5a sends via link 6 towards the active board 2. The same data traffic is sent by the data source 5b via link 8 to the passive board 3 and further via the internal link 9 to the active board 2 that selects one of the two external links as an input and sends the data further via internal link 7 towards the core 4.

In normal operation the active board 2 has the role of the working board, it takes the data traffic from link 6. Board 3 has the role of the standby board, it forwards the incoming traffic to the active board.

When link 6 becomes unusable, the data traffic is taken from internal link 9 (protected operation). The Link Supervision Block 10 controls the switch between these two modes. The roles of the boards are swapped.

Essential for the usability of the protected operation mode is the absence of faults that might disturb data traffic on internal link 9. Therefore the supervision block 10 needs information about the transmitter state from board 3 and about the receiver state from board 2. Information from both boards is needed to be able to decide about the cause of a possible fault to determine if a switch is possible or needed.

Figure 2:
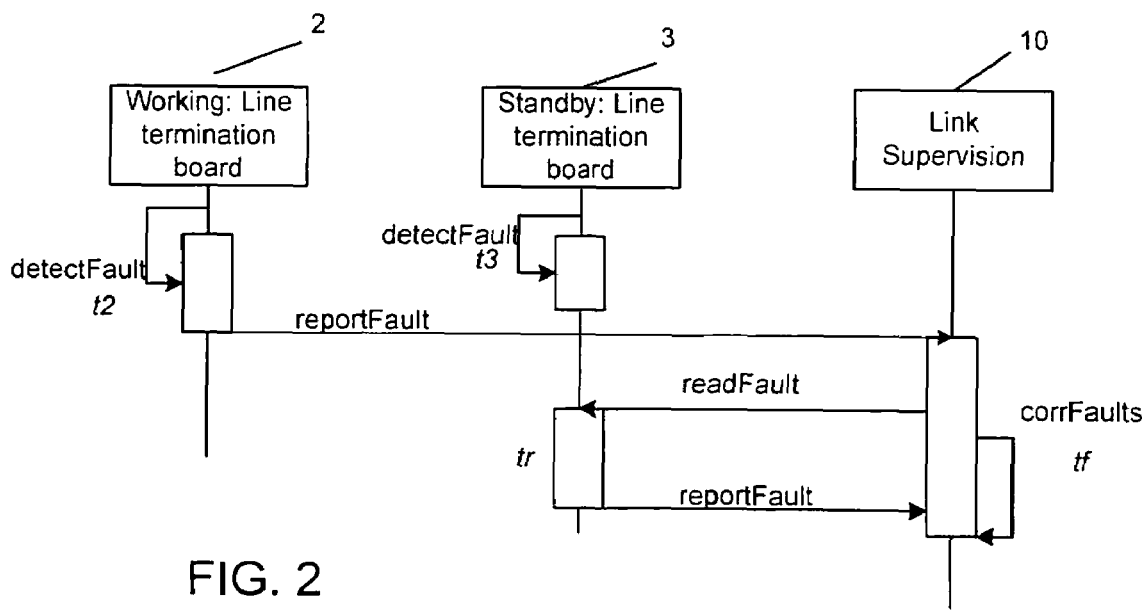
FIG. 2 is a sequence diagram showing the detection of a fault in the system outlined in FIG. 1 (prior art)

FIG. 2 is a sequence diagram showing the detection of a fault in the system outlined in FIG. 1. As explained earlier, faults detected on the working board 2 will be sent towards the supervision block 10 spontaneously when they are detected. The supervision block then reads out the state information from the standby board 3. The results are correlated to achieve information about a fault cause (failure in board 2, failure in board 3, link failure, no failure).

In one instance one class of faults is detected on both boards. Due to varying detection and signal transmission times, it is not determined which fault will be reported first {t3<t2} or {t3>t2}. It is possible that the fault on board 3 is detected after the information was read out {t3−tr>0}. Then the correlation result at {tf} does not reflect the physical situation.

Varying detection times can e.g. be caused by checks that are triggered by expiry of a fixed-period timer. Since these faults can not be detected between the checks, the detection time may vary from 0 up to a time period.

The correlation result is not checked for persistency in a defined period. This might lead to unjustified failure from the supervision block towards an operator in case of a single short disturbance.

The implementation of this method as a software program is expensive because the two different roles of the board imply different reactions upon fault detection. Only the working one reports spontaneously, the functionality to switch between the two roles must be implemented in a way that secures that knowledge on initial faults of the standby board are preserved.

Figure 3:
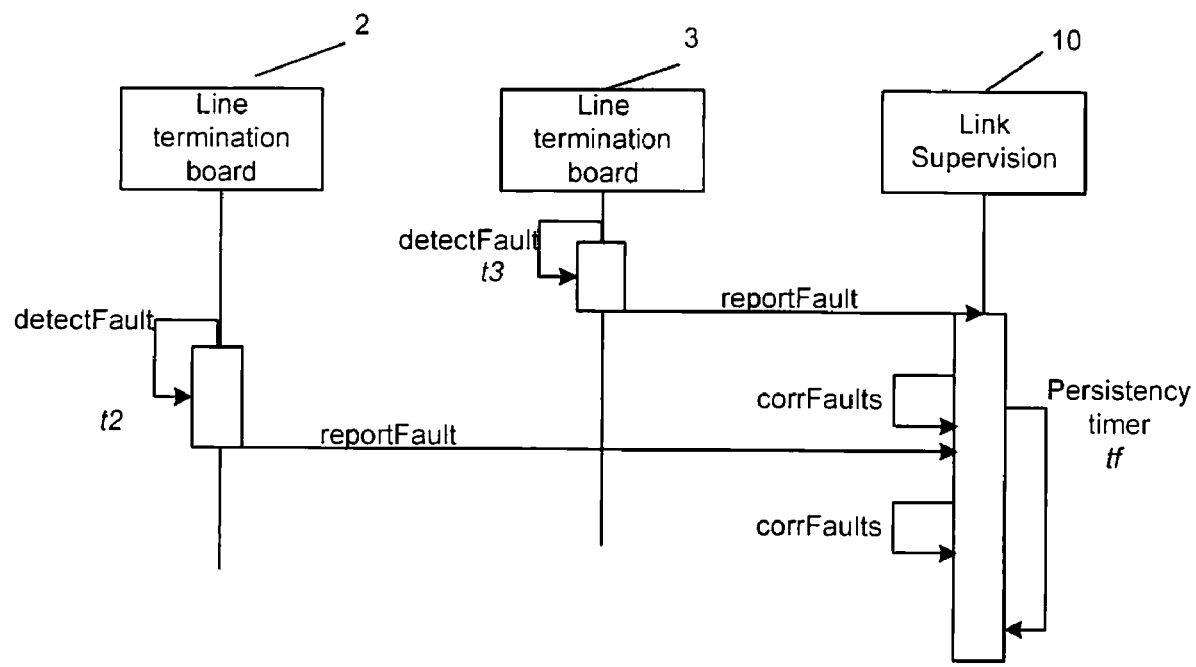
FIG. 3 shows a similar diagram and the detection of faults in a system according to the present invention.

FIG. 3 shows the timing diagram for a system according to the invention. The hardware is as described in FIG. 1. However, several new functions are implemented in the line boards 2,3 and the supervision block 10.

According to a first embodiment of the invention, the following actions are performed when each of the boards 2,3 detect a fault state change:

Both boards report all fault state changes spontaneously when they are detected to the supervision block.

The supervision block stores the received faults causes.

The received fault cause is correlated with the latest received fault cause of the board terminating the other end of the link.

A timer is started to supervise the persistency of the correlation result.

When the result has not disappeared during the persistency timer period, it can be reported.

If the correlation result shows that a traffic-disturbing fault on the link has occurred and that the traffic can be reestablished by some actions is the node, e.g. re-routing, then these actions can be started.

One advantage of this system is that the result of the supervision block is as accurate as possible since all fault changes are reported immediately after detection. This overcomes the timing problems of the known solution.

The persistency check ensures that the correlation result is correct and stable.

The timeout can be selected to fulfill system requirements for a specified detection time.

The timeout can be selected to suppress short time disturbances.

The method is inexpensive and can thereby easily be implemented as a computer program because the fault detection mechanism in both boards is independent of the board's role (working/standby).

In an alternative embodiment of the invention an additional persistency check is implemented before the correlation is done. If this check is done by the reporting board, the amount of signaling towards the supervision block can be reduced in case of faults that change state with a high frequency. With this pre-correlation check, the persistency check after correlation could be left out under certain circumstances.

While the present invention has been described in relation to SDH based networks, the applicability is not restricted to this particular type of network. All transmission techniques can be used that support error detection. Thus, this system can be used for general link supervision, when information about the sender of data traffic as well as information about the receiver of data traffic is available at different locations and needs to be correlated to gain information about the state of the link.

The invention claimed is:

1. A method for protection link fault supervision, comprising the steps of
monitoring active and standby transmission lines between a sending node and a receiving node, wherein both transmission lines carry identical data traffic,
terminating each transmission line at a separate line termination board, each line termination board associated with a persistency timer for timing persistency of a fault;
detecting and reporting faults on each transmission line simultaneously to a link supervision block associated with the receiving node, wherein the link supervision block is adapted for
storing fault causes received from the termination boards;
correlating the fault causes received from each termination board and
switching between the active transmission line termination board and the standby transmission line termination board;
comparing the persistency of fault time periods in each transmission line with a predetermined period;
determining that a correlation of the fault causes and the comparison of the fault time periods indicates a traffic disturbing fault on the active link; and
switching the traffic from the active line termination board to the standby line termination board.

2. method of claim 1, wherein the active line termination board timer is started upon detection of a fault.

3. The method of claim 2, wherein the active and standby line termination boards both report all fault state changes when the fault state changes are detected.

4. The method of claim 3, wherein an additional persistency check is made before correlation of the fault causes.

5. In a network, a node for providing link fault supervision between nodes, the node comprising:
means for monitoring active and standby transmission lines between a sending node and a receiving node, wherein both transmission lines carry identical data traffic,
means for terminating each transmission line at a separate line termination board, each line termination board associated with a persistency timer for timing persistency of a fault;
means for detecting and reporting faults on each transmission line simultaneously to
a link supervision block associated with the receiving node, wherein the link supervision block is adapted for
storing fault causes received from the termination boards;
correlating the fault causes received from each termination board and
switching between the active transmission line termination board and the standby transmission line termination board;
means for comparing the persistency of fault time periods in each transmission line with a predetermined period;
means for determining that a correlation of the fault causes and the comparison of the fault time periods indicates a traffic disturbing fault on the active link; and
means for switching the traffic from the active line termination board to the standby line termination board.

6. The node of claim 5, wherein each line termination board includes a persistency timer.

7. The node of claim 6, further comprising means for making an additional persistency check before correlation of the fault causes.

8. The node of claim 5, wherein the active line termination board timer is started upon detection of a fault.

9. The node of claim 8, wherein the active and standby line termination boards both report all fault state changes when the fault state changes are detected.

* * * * *

UNITED STATES PATENT AND TRADEMARK OFFICE
CERTIFICATE OF CORRECTION

PATENT NO. : 7,257,746 B2 Page 1 of 1
APPLICATION NO. : 10/526720
DATED : August 14, 2007
INVENTOR(S) : Schirdewahn It is certified that error appears in the above-identified patent and that said Letters Patent is hereby corrected as shown below:

Column 4, line 22, insert -- The --, before "method".

Signed and Sealed this

Seventeenth Day of June, 2008

JON W. DUDAS
*Director of the United States Patent and Trademark Office*